Figure 1:
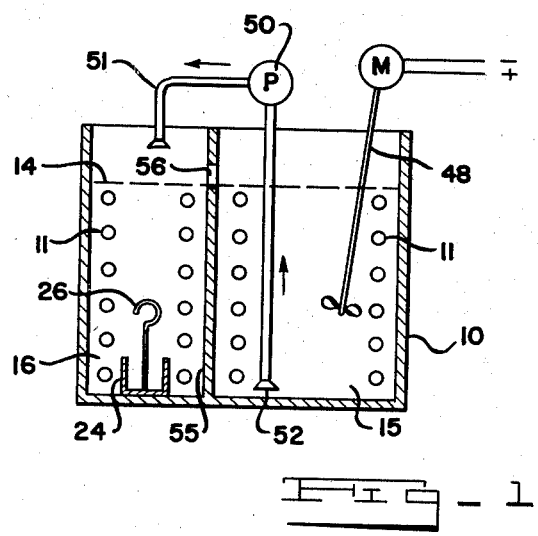

INVENTORS
ROBERT H. SHOEMAKER
BY JOHN A. FALER

*Daniel G. Cullen*
ATTORNEY

United States Patent Office 2,863,465
Patented Dec. 9, 1958

2,863,465

APPARATUS FOR METAL CLEANING BY MOLTEN SALT BATHS

Robert H. Shoemaker and John A. Faler, Detroit, Mich., assignors to Kolene Corporation, Detroit, Mich.

Application January 10, 1955, Serial No. 480,862

3 Claims. (Cl. 134—104)

This application relates particularly to the cleaning of metals by means of molten salt baths and is specifically directed to improvements in apparatus used for such purposes and more specifically to means for sludge removal, for replenishing the salt of the bath, and for agitation of the bath.

Introduction

For some years the art has been utilizing molten salt baths for the cleaning of metals. In Patent No. 2,458,661 of January 11, 1949, there is described a metal cleaning process using a molten salt bath for the cleaning of metal. Numerous other patents also disclose compositions and processes of this general type. Patents Nos. 2,635,062 and 2,635,063 of April 4, 1953, disclose what are known as continuous strip baths for cleaning metal strip continuously in molten salt baths.

It is to the art of cleaning metal by means of molten salt baths, to which this application relates.

In the cleaning of metals by means of means of molten salt baths, there are generally two processes known to the trade. One is known as the batch process, wherein a batch of work parts are deposited in the bath, and then withdrawn after an interval. The other process more specifically shown in Patent No. 2,635,062 is known as the continuous strip process, where a strip of metal to be cleaned moves continuously through a bath.

This application relates to improvements in baths for both types of processes.

Sludge removal

In such baths, sludge is formed and eventually settles to the bottom of the bath. Removal of such sludge is a primary concern of this application.

One object of this application is to provide for the removal of the sludge by means of side chambers, that is to say, chambers within the bath but to one side or both sides of the work area, with some sort of mechanical means for removal of the sludge deposited in such side chambers.

One way of removing the sludge from such side chamber is to provide in the side chamber a lift out pan into which the sludge is deposited and which may be lifted out for removal of the sludge.

This application also has for an object the provision of means within a bath for agitating and stirring it so as to improve its operation and to assist in moving sludge into a side chamber or side settling basin where such chamber is provided in accordance with what has been described just above in connection with sludge removal.

Aided by an understanding of the invention as may be obtained from the foregoing, reference will now be had to the apended drawing in which a specific embodiment of the foregoing concepts have been disclosed.

Figure 2:
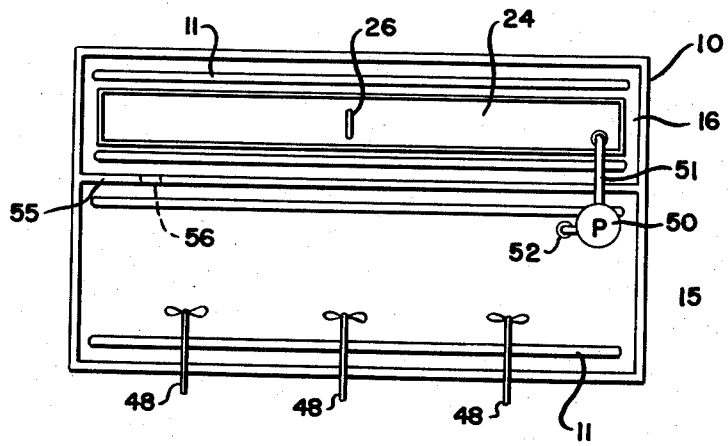

In the drawing:

Figs. 1 and 2 are a diagrammatic end elevation crosssection and plan view of the bath showing a side sludge settling chamber for settling sludge together with a pump for moving the molten salt from the work chamber to the side settling chamber.

Figs. 1 and 2 show a molten salt bath comprising a pot having burner tubes or heating pipes 11 for heating salt which fills the pot 10 to a level 14 and within the tubes or pipes 11 is a work area 15 to the left of which is a side chamber 16 in which is disposed a lift out pan 24 provided with a lift out bail 26. Pan 24 fills with sludge and may be lifted out for the removal of such sludge.

In addition, there is provided an agitation means comprising agitators 48. Also, there is provided a pump 50 having its inlet 52 located within the work area 15 and its outlet 51 in the side chamber 16 where the sludge may be settled.

Between the work area 15 and the side chamber 16 is a barrier wall 55 having an overflow opening 56 which enables free movement of the liquid to the work area from the side chamber, with the level maintained equal in both the work area 15 and the side chamber 16 by means of the overflow opening 56.

The agitation means 48 constantly agitates the bath for the purposes of continuously and smoothly directing sludge out of the work area into the side chamber.

It will be observed that agitation of the salt bath as here disclosed insures rapid movement of the salt over the heating means, to heat the salt more rapidly, to accelerate heat transfer from the heating means to prolong their life, to insure more nearly uniform heating of the salt, and to prevent formation of deposits on the heating means.

Now having described the embodiments heretofore disclosed, reference should be had to the claims which follow.

We claim:

1. A molten salt bath apparatus for cleaning metals of surface impurities comprising a pot having a work zone and having to one side of said work zone a settling basin, with said work zone and settling basin being relatively separated and barriered, heater tubes in said work zone and settling basin, means in the work zone for agitating said bath and for pumping said bath from said work zone to said basin, and an overflow means for permitting overflow from said basin to flow over it back to said work zone, and mechanical means for removing from said basin impurities settled therein as a sludge.

2. A molten salt bath apparatus for cleaning metals of surface impurities comprising a pot having a work zone and having to one side of said work zone a settling basin, with said work zone and settling basin being relatively separated and barriered, heater tubes in said work zone and settling basin, means in the work zone for agitating said bath and for pumping said bath from said work zone to said basin, and an overflow means for permitting overflow from said basin to flow over it back to said work zone, and mechanical means for removing from said basin impurities settled therein as a sludge, said first means comprising an agitator in said bath.

3. A molten salt bath apparatus for cleaning metals of surface impurities comprising a pot having a work zone and having to one side of said work zone a settling basin, with said work zone and settling basin being relatively separated and barriered, heater tubes in said work zone and settling basin, means in the work zone for agitating said bath and for pumping said bath from said work zone to said basin, and an overflow means for permitting overflow from said basin to flow over it back to said work zone, and mechanical means for removing from said basin impurities settled therein as a sludge, said first means including a pump whose inlet is in the work zone and whose outlet is in the basin and operating for pumping faster than the impurities settle as a sludge in the work zone.

References Cited in the file of this patent

UNITED STATES PATENTS

| | | |
|---|---|---|
| 1,508,015 | Egleson | Sept. 9, 1924 |
| 1,899,657 | Zademach | Feb. 28, 1933 |
| 2,155,854 | Barnes | Apr. 25, 1939 |
| 2,244,301 | Le Gore | June 3, 1941 |
| 2,295,912 | Pagenkopf | Sept. 15, 1942 |
| 2,410,380 | Jamieson | Oct. 29, 1946 |
| 2,477,948 | Allen | Aug. 2, 1949 |
| 2,552,852 | Idle | May 15, 1951 |
| 2,604,386 | Arant | July 22, 1952 |
| 2,628,627 | Huff | Feb. 17, 1953 |